P. T. ELTING.
Grinding-Mill.
No. 203,127. Patented April 30, 1878.
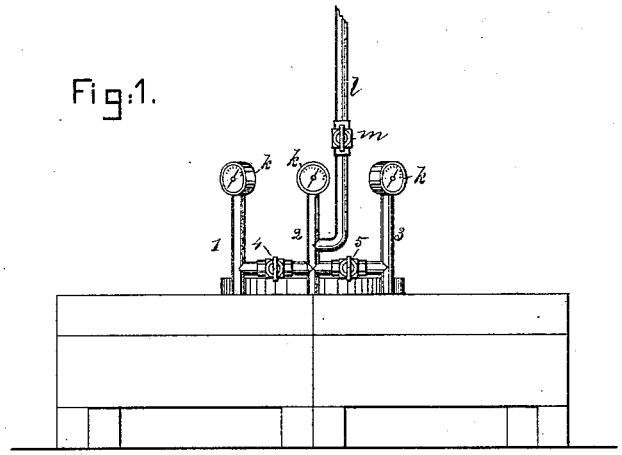
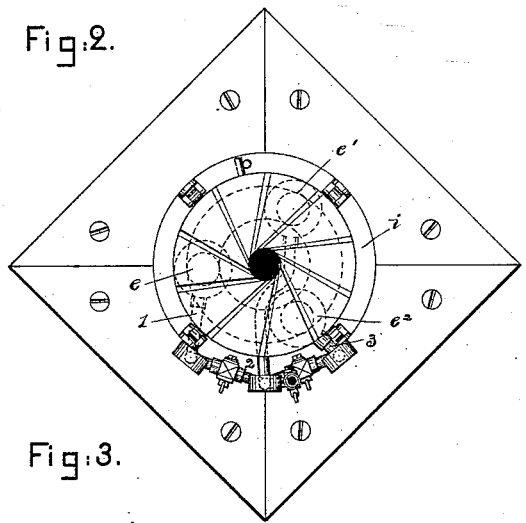
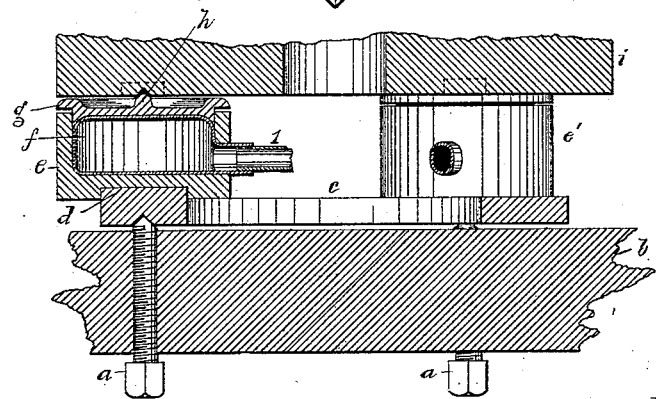
Witnesses.
H. Hunawadel
L. A. Baxter
Inventor,
Peter T Elting
by Crosby Gregory Atty.

UNITED STATES PATENT OFFICE.

PETER T. ELTING, OF BOSTON, MASSACHUSETTS.

IMPROVEMENT IN GRINDING-MILLS.

Specification forming part of Letters Patent No. 203,127, dated April 30, 1878; application filed February 1, 1878.

*To all whom it may concern:*

Be it known that I, PETER T. ELTING, of Boston, county of Suffolk, State of Massachusetts, have invented an Improvement in Grinding-Mills, of which the following is a specification:

This invention relates to improvements in grinding-mills, and has special reference to mechanism for setting and adjusting the bed-stone through the medium of a liquid, which, contained in suitable vessels, receives and sustains the weight and pressure of the bed-stone in grinding, or the pressure alone, according to whether the bed-stone is above or below the runner.

Figure 1 represents, in side elevation, a sufficient portion of a grinding-mill to show an embodiment of my invention; Fig. 2, a top view thereof, the stone-supporting mechanism being shown in dotted lines; and Fig. 3 is a section, showing one of the liquid-containing vessels and its adjacents.

In the drawings, a leveling-plate, $c$, circular or triangular, as may be desired, supported upon and made adjustable by means of leveling-screws $a$ in the frame $b$, sustains upon it a series of liquid-holding vessels, $e$ $e^1$ $e^2$.

Within these liquid-holding vessels are fitted caps or followers $g$, adapted to rest upon elastic or movable diaphragms of india-rubber, supported by the liquid in the vessels below them, the bed-stone resting upon such caps or followers, as shown in the drawings.

In Fig. 3 the diaphragm of india-rubber is shown as a bag, $f$; but instead thereof movable diaphragms may be secured to the vessels.

The liquid-holding vessels are each provided with a pipe to introduce liquid into the vessels. Such pipes are shown at 1 2 3. The pipes 1 and 2 are joined with pipe 3 by cross-pipes furnished with valves 4 5, and upon or connected with each pipe is a suitable pressure-indicating gage, $k$. A pipe, $l$, connected with one of these pipes leading to the vessels, (shown as pipe 2,) is employed as the pipe with which connection is made to fill the vessels with liquid, a valve in pipe $l$ serving to cut off the flow of liquid through it when desired.

In operation the leveling-plate is leveled by means of the leveling-screws $a$, the caps or followers are placed therein above the diaphragms, and the bed-stone is sustained by or rested against the caps or followers, the latter resting against the tops of the vessels. In this condition the bed-stone is leveled, and the spindle is made exactly vertical therewith, or as nearly so as possible, in any usual way, and when in tram the liquid is admitted into the vessels below the caps or followers (the valves $m$ 4 5 being opened) under sufficient force or pressure to lift the diaphragms and raise the caps or followers from contact with the tops of the vessels, as shown in the drawings, and thereafter the bed-stone is sustained by a liquid bed or support of uniform density.

Should the bed-stone not be exactly level, weights may be attached to its under side to make it level, and thereafter it will remain in tram.

Instead of the flexible diaphragms shown in Fig. 3, the bed-stone may rest upon pistons fitted to the interiors of the vessels supported by the leveling-plate, a suitable packing being employed to make the piston fit the interiors of the vessels; but this plan would not be as well.

Sustaining a bed-stone upon a liquid bed results in saving much power, and insures more even grinding.

To prevent the material being ground from escaping below the bed-stone, a piece of belting may be placed about the periphery of the stone below its upper surface.

This liquid bed balances and holds the stone in tram, and does not serve the purpose of or act as a spring. Air or gas used instead of liquid would not answer the purposes of the liquid, as described in this specification.

The pressure-gages, when the valves 4 5 are open, will show the pressure between the bed-stone and runner, and indicate whether it is more or less than should be required for the work being done. By closing the valves 4 5 each gage will show the amount of pressure between the bed-stone and runner at or near the liquid-holding vessel with which the gage is connected, thereby enabling the miller to inform himself at any time if the bed-stone is in tram.

I claim—

1. A bed-stone and liquid support therefor, to operate substantially as described.

2. A bed-stone and liquid-holding vessels, combined with caps or followers fitted thereto, and adapted to be sustained by the liquid within the vessels, substantially as shown.

3. The bed-stone, caps, and vessels to contain liquid, combined with pipes to connect the vessels and permit the liquid in them to be in communication, substantially as set forth.

4. In a grinding-mill, vessels to contain liquid, as described, and caps and a bed-stone sustained by the force of the liquid under the caps, in combination with pipes and pressure-gages, to operate substantially as described.

5. In combination, a bed-stone, liquid-holding vessels, a diaphragm therein, and caps adapted to rest against the diaphragms, and be lifted from the vessels with the bed-stone by the pressure of the liquid in the vessels, substantially as described.

6. In combination, liquid-holding vessels, a bed-stone, caps supported upon a liquid within the vessels, substantially as described, and a leveling-plate and leveling-screws, all to operate substantially as set forth.

7. The liquid-holding vessels, caps, bed-stone, and connecting-pipes, combined with valves 4 5 between them, substantially as set forth.

In testimony whereof I have signed my name to this specification in the presence of two subscribing witnesses.

PETER T. ELTING.

Witnesses:
G. W. GREGORY,
L. A. BAXTER.